United States Patent
Mouton et al.

(10) Patent No.: US 10,337,644 B2
(45) Date of Patent: Jul. 2, 2019

(54) ADJUSTABLE VALVE GRIP

(71) Applicants: Guy A Mouton, Woodstock, IL (US); Samuel C. Rinaldo, Carol Stream, IL (US)

(72) Inventors: Guy A Mouton, Woodstock, IL (US); Samuel C. Rinaldo, Carol Stream, IL (US)

(*) Notice: Subject to any disclaimer, the term of this patent is extended or adjusted under 35 U.S.C. 154(b) by 0 days.

(21) Appl. No.: 15/408,901

(22) Filed: Jan. 18, 2017

(65) Prior Publication Data

US 2018/0202576 A1 Jul. 19, 2018

(51) Int. Cl.
*F16K 31/60* (2006.01)
*F17C 13/04* (2006.01)
*G05G 1/00* (2006.01)

(52) U.S. Cl.
CPC ............. *F16K 31/60* (2013.01); *F17C 13/04* (2013.01); *G05G 1/00* (2013.01)

(58) Field of Classification Search
CPC ......... F16K 31/607; F16K 27/02; F16K 31/60
USPC .......... 251/293, 291, 292; 16/422, 421, 426, 16/427; 137/382, 377
See application file for complete search history.

(56) References Cited

U.S. PATENT DOCUMENTS

| | | | | |
|---|---|---|---|---|
| 3,612,104 A * | 10/1971 | Busquets | .............. | F16K 11/202 137/597 |
| 3,910,308 A * | 10/1975 | Mack | ..................... | F16K 31/60 116/277 |
| 4,665,386 A * | 5/1987 | Haws | .................. | F16K 37/0041 116/112 |
| 5,231,731 A * | 8/1993 | Jones, Jr. | .............. | E05B 1/0053 16/412 |
| 5,695,169 A * | 12/1997 | Higgins | ................ | F16K 5/0414 16/441 |
| 5,711,511 A * | 1/1998 | Cynar | ..................... | F16K 31/46 137/360 |
| 2010/0300558 A1* | 12/2010 | Boyer | ..................... | F17C 13/04 137/557 |
| 2012/0266410 A1* | 10/2012 | Huang | .................... | F16K 31/60 16/110.1 |

OTHER PUBLICATIONS

Sentinel Group PTY LTD; Tri Head Machine Screw; Aug. 7, 2016; https://web.archive.org/web/20160807131115/https://www.sentinelgrp.com.au/c-26-01-10-tri-head.aspx.*

* cited by examiner

*Primary Examiner* — Kevin F Murphy
*Assistant Examiner* — Kelsey E Cary
(74) *Attorney, Agent, or Firm* — Underwood & Associates, LLC

(57) ABSTRACT

According to some embodiments, an adjustable valve grip is presented. In an embodiment, the adjustable valve grip comprises a first portion and a second portion wherein the second portion is operatively connected to the first portion and wherein the first portion is dimensioned such a way that the first portion is capable of being snap-fit over a gas cylinder valve handle and wherein the second portion is dimensioned in such a way as to be capable of being adjusted through its operative connection to the first portion so that when the first portion has been snap fit over a gas cylinder valve handle a user can adjust the second portion to bring the second portion into firm contact with the gas cylinder valve handle, and wherein at least one of the first portion, or the second portion, or both are colored in such a way as to be easily visible to the human eye.

10 Claims, 3 Drawing Sheets

ADJUSTABLE VALVE GRIP

CROSS-REFERENCE TO RELATED APPLICATIONS

This application claims priority to U.S. Provisional Application No. 61/280016 filed Jan. 18, 2016, and incorporated herein by reference in its entirety.

FIELD

A device for assisting in the opening, adjustment and closing of a valve is generally described. More specifically, a device for assisting in the opening, adjustment and closing of a valve on a portable gas cylinder for propane or other gases is generally described.

BACKGROUND

Valve handles can be difficult to locate. Once a valve handle is located, it can be difficult to turn. This difficulty in locating and turning valve handles can be even worse for people who have physical limitations, medical conditions, or are simply older or weaker than a typical user.

Past methods for locating, opening, adjusting, and closing valve handles, such as looking for a valve handle and then turning it by hand have been found to be insufficient for a number of users. For example, the valve handle, which is a relatively small piece of metal, and which may be the same, or a similar to, the color of other items around the valve handle can make locating valve handles difficult, especially for those with poor vision. Additionally, once a valve handle is located, using a bare hand to adjust the valve handle can be difficult for those with physical limitations or medical conditions such as arthritis or weakness in the limbs.

In view of the disadvantages associated with currently available methods and devices for opening, adjusting or closing valve handles, there is a need for a device and method that allows a user to locate a valve handle quickly and to adjust a valve handle with less effort.

BRIEF DESCRIPTION

According to an aspect, the present embodiments may be an adjustable valve grip for a gas cylinder valve handle, the adjustable valve grip comprising: a first portion of the adjustable valve grip; a second portion of the adjustable valve grip; wherein at least one of the first portion of the adjustable valve grip, or the second portion of the adjustable valve grip, is colored in such a way as to be easily visible to the human eye; wherein the second portion of the adjustable valve grip is operatively connected to the first portion of the adjustable valve grip; wherein the first portion of the adjustable valve grip is dimensioned such a way that the first portion of the adjustable valve grip is capable of being snap-fit over the gas cylinder valve handle; and wherein the second portion of the adjustable valve grip is dimensioned in such a way as to be capable of being adjusted through its operative connection to the first portion of the adjustable valve grip so that when the first portion of the adjustable valve grip has been snap fit over the gas cylinder valve handle a user can adjust the second portion of the adjustable valve grip to bring the second portion of the adjustable valve grip into firm contact with the gas cylinder valve handle.

According to another aspect, the present embodiments may further comprise the second portion of the adjustable valve grip being a threaded screw.

According to another aspect, the present embodiments may further comprise where either the first portion of the adjustable valve grip, or the second portion of the adjustable valve grip, is colored red as to be easily visible to the human eye.

According to another aspect, the present embodiments may further comprise where both the first portion of the adjustable valve grip, and the second portion of the adjustable valve grip, are colored in such a way as to be easily visible to the human eye.

According to another aspect, the present embodiments may further comprise where the at least one of the first portion of the adjustable valve grip, or the second portion of the adjustable valve grip, is colored red.

According to another aspect, the present embodiments may further comprise where both the first portion of the adjustable valve grip, and the second portion of the adjustable valve grip, are colored the same color as to be easily visible to the human eye.

According to another aspect, the present embodiments may further comprise where both the first portion of the adjustable valve grip, and the second portion of the adjustable valve grip, are colored red as to be easily visible to the human eye.

According to another aspect, the present embodiments may further comprise where the first portion of the adjustable valve grip is colored so that it is easily visible to the human eye and the second portion of the adjustable valve grip is colored so that it is easily visible to the human eye and both first portion of the adjustable valve grip and the second portion of the adjustable valve grip are different colors that are easily visible to the human eye.

According to another aspect, the present embodiments may further comprise where the first portion of the adjustable valve grip, or the second portion of the adjustable valve grip, is colored red.

According to another aspect, the present embodiments may further comprise an adjustable valve grip for a gas cylinder valve handle, the adjustable valve grip comprising: a first portion of the adjustable valve grip; a second portion of the adjustable valve grip; wherein the first portion of the adjustable valve grip, or the second portion of the adjustable valve grip, or both, are colored in such a way as to be easily visible to the human eye; wherein the second portion of the adjustable valve grip is a threaded screw operatively connected to the first portion of the adjustable valve grip; wherein the first portion of the adjustable valve grip is capable of being snap fit over a gas cylinder valve handle measuring approximately 1.744 inches in diameter and up to approximately 0.69 inches in height; and wherein the second portion of the adjustable valve grip is dimensioned in such a way as to be capable of being adjusted through its operative connection to the first portion of the adjustable valve grip so that when the first portion of the adjustable valve grip has been snap fit over the gas cylinder valve handle a user can adjust the second portion of the adjustable valve grip to bring the second portion of the adjustable valve grip into firm contact with the gas cylinder valve handle for gas cylinder valve handles that are less than approximately 0.69 inches in height.

According to another aspect, the present embodiments may be an adjustable valve grip for a gas cylinder valve handle, the adjustable valve grip comprising: a first portion of the adjustable valve grip; a second portion of the adjustable valve grip; wherein the first portion of the adjustable valve grip, or the second portion of the adjustable valve grip, are colored in such a way as to be easily visible to the human eye; wherein the second portion of the adjustable valve grip is a threaded screw operatively connected to the first portion of the adjustable valve grip; wherein the first portion of the adjustable valve grip is dimensioned in such a way that the first portion of the adjustable valve grip is capable of being snap-fit over the gas cylinder valve handle; and wherein the second portion of the adjustable valve grip is dimensioned in such a way as to be capable of being adjusted through its operative connection to the first portion of the adjustable valve grip so that when the first portion of the adjustable valve grip has been snap fit over the gas cylinder valve handle a user can adjust the second portion of the adjustable valve grip to bring the second portion of the adjustable valve grip into firm contact with the gas cylinder valve handle.

According to another aspect, the present embodiments may further comprise where the first portion of the adjustable valve grip, or the second portion of the adjustable valve grip, is colored red as to be easily visible to the human eye.

According to another aspect, the present embodiments may further comprise where both the first portion of the adjustable valve grip, and the second portion of the adjustable valve grip, are colored in such a way as to be easily visible to the human eye.

According to another aspect, the present embodiments may further comprise where the first portion of the adjustable valve grip, or the second portion of the adjustable valve grip, is colored red.

According to another aspect, the present embodiments may further comprise both the first portion of the adjustable valve grip, and the second portion of the adjustable valve grip, are colored the same color so as to be easily visible to the human eye.

According to another aspect, the present embodiments may further comprise both the first portion of the adjustable valve grip, and the second portion of the adjustable valve grip, are colored red as to be easily visible to the human eye.

According to another aspect, the present embodiments may further comprise the first portion of the adjustable valve grip is colored so that it is easily visible to the human eye and the second portion of the adjustable valve grip is colored so that it is easily visible to the human eye and both first portion of the adjustable valve grip and the second portion of the adjustable valve grip are different colors that are easily visible to the human eye.

According to another aspect, the present embodiments may further comprise the first portion of the adjustable valve grip, or the second portion of the adjustable valve grip, is colored red to be easily visible to the human eye.

According to another aspect, the present embodiments may An adjustable valve grip for a gas cylinder valve handle, the adjustable valve grip comprising: a first portion of the adjustable valve grip; a second portion of the adjustable valve grip; wherein the first portion of the adjustable valve grip, or the second portion of the adjustable valve grip, or both, are colored in such a way as to be easily visible to the human eye; wherein the second portion of the adjustable valve grip is a threaded screw operatively connected to the first portion of the adjustable valve grip; wherein the first portion of the adjustable valve grip is dimensioned in such a way that the first portion of the adjustable valve grip is capable of being snap-fit over the gas cylinder valve handle; and wherein the second portion of the adjustable valve grip is dimensioned in such a way as to be capable of being adjusted through its operative connection to the first portion of the adjustable valve grip so that when the first portion of the adjustable valve grip has been snap fit over the gas cylinder valve handle a user can adjust the second portion of the adjustable valve grip to bring the second portion of the adjustable valve grip into firm contact with the gas cylinder valve handle.

According to another aspect, the present embodiments may further comprise the first portion of the adjustable valve grip, or the second portion of the adjustable valve grip, is colored red to be easily visible to the human eye.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments.

The term "colored in such a way as to be easily visible to the human eye" may mean any color that is known to those skilled in the art that can be used to draw the attention of a user to the adjustable valve grip thereby helping a user locate the adjustable valve grip as well as the valve handle the adjustable valve grip is attached to. The colors may include, but are not limited to, yellow, green, orange and red.

The term "dimensioned such a way as to be capable of being snap-fit over a gas cylinder valve handle" may mean that the contours of the first portion of the adjustable valve grip are such that it will snap fit over a variety of gas cylinder valve handles as is known to one skilled in the art. In one embodiment "dimensioned in such a way as to be capable of being snap-fit over a gas cylinder valve handle" may mean that the adjustable valve grip is capable of being snap fit over a valve handle that is approximately 1.744 inches in diameter and up to approximately 0.69 inches in height.

The term "dimensioned in such a way as to be capable of being adjusted through its operative connection" may mean that the second portion of the adjustable valve grip may be moved with respect to the first portion of the adjustable valve grip and will retain its relative position once it has been set by a user. This may be accomplished through a threaded connection, a sliding connection, a snap fit connection, and the like as is known to one skilled in art.

For purposes of illustrating features of the embodiments, a simple example will now be introduced and referenced throughout the disclosure. Those skilled in the art will recognize that this example is illustrative and not limiting and is provided purely for explanatory purposes. In the illustrative example and as seen in FIG. 1.

Figure 1:
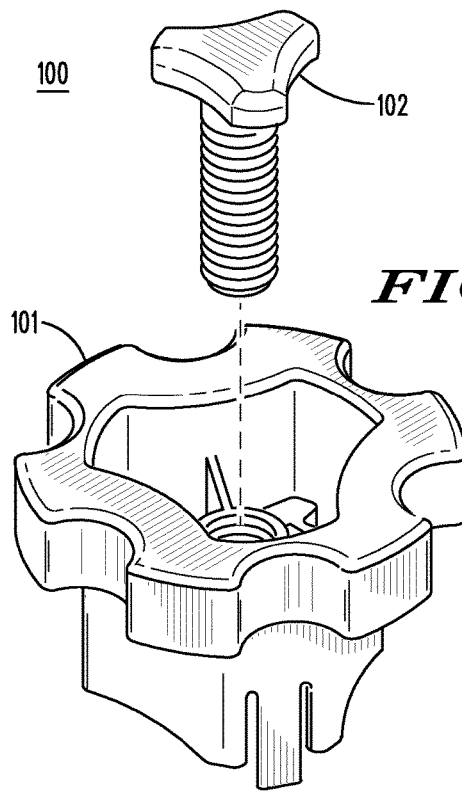
FIG. 1 is an exploded perspective view of an adjustable valve grip according to an embodiment showing the adjustable valve grip in an unassembled manner.

FIG. 1 shows an exploded perspective view of an embodiment of an adjustable valve grip 100. In FIG. 1 showing an adjustable valve grip 100 for a gas cylinder valve handle (not shown), the adjustable valve grip 100 comprising: a first portion 101 of the adjustable valve grip 100; a second portion 102 of the adjustable valve grip 100; wherein at least one of the first portion 101 of the adjustable valve grip 100, or the second portion 102 of the adjustable valve grip 100, is colored in such a way as to be easily visible to the human eye; wherein the second portion 102 of the adjustable valve grip 100 is operatively connected to the first portion 101 of the adjustable valve grip 100; wherein the first portion 101 of the adjustable valve grip 100 is dimensioned such a way that the first portion 101 of the adjustable valve grip 100 is capable of being snap-fit over the gas cylinder valve handle (not shown); and wherein the second portion 102 of the adjustable valve grip 100 is dimensioned in such a way as to be capable of being adjusted through its operative connection to the first portion 101 of the adjustable valve grip 100 so that when the first portion 101 of the adjustable valve grip 100 has been snap fit over the gas cylinder valve handle (not shown) a user can adjust the second portion 102 of the adjustable valve grip 100 to bring the second portion 102 of the adjustable valve grip 100 into firm contact with the gas cylinder valve handle (not shown).

According to another aspect, the present embodiments may further comprise the second portion 102 of the adjustable valve grip 100 being a threaded screw.

According to another aspect, the present embodiments may further comprise where either the first portion 101 of the adjustable valve grip 100, or the second portion 102 of the adjustable valve grip 100, is colored red as to be easily visible to the human eye.

According to another aspect, the present embodiments may further comprise where both the first portion 101 of the adjustable valve grip 100, and the second portion 102 of the adjustable valve grip, are colored in such a way as to be easily visible to the human eye.

According to another aspect, the present embodiments may further comprise where the at least one of the first portion 101 of the adjustable valve grip 100, or the second portion 102 of the adjustable valve grip 100, is colored red.

According to another aspect, the present embodiments may further comprise where both the first portion 101 of the adjustable valve grip 100, and the second portion 102 of the adjustable valve grip 100, are colored the same color as to be easily visible to the human eye.

According to another aspect, the present embodiments may further comprise where both the first portion 101 of the adjustable valve grip 100, and the second portion 102 of the adjustable valve grip 100, are colored red as to be easily visible to the human eye.

According to another aspect, the present embodiments may further comprise where the first portion 101 of the adjustable valve grip 100 is colored so that it is easily visible to the human eye and the second portion 102 of the adjustable valve grip 100 is colored so that it is easily visible to the human eye, and both first portion 101 of the adjustable valve grip 100 and the second portion 102 of the adjustable valve grip 100 are different colors that are easily visible to the human eye.

According to another aspect, the present embodiments may further comprise where the first portion 101 of the adjustable valve grip 100, or the second portion 102 of the adjustable valve grip 100, is colored red.

According to another aspect, the present embodiments may further comprise an adjustable valve grip 100 for a gas cylinder valve handle, the adjustable valve grip 100 comprising: a first portion 101 of the adjustable valve grip 100; a second portion 102 of the adjustable valve grip 100; wherein the first portion 101 of the adjustable valve grip 100, or the second portion 102 of the adjustable valve grip 100, or both, are colored in such a way as to be easily visible to the human eye; wherein the second portion 102 of the adjustable valve grip 100 is a threaded screw operatively connected to the first portion 101 of the adjustable valve grip 100; wherein the first portion 101 of the adjustable valve grip 100 is capable of being snap fit over a gas cylinder valve handle measuring approximately 1.744 inches in diameter and up to approximately 0.69 inches in height; and wherein the second portion 102 of the adjustable valve grip 100 is dimensioned in such a way as to be capable of being adjusted through its operative connection to the first portion 101 of the adjustable valve grip 100 so that when the first portion 101 of the adjustable valve grip 100 has been snap fit over the gas cylinder valve handle a user can adjust the second portion 102 of the adjustable valve grip 100 to bring the second portion 102 of the adjustable valve grip into firm contact with the gas cylinder valve handle for gas cylinder valve handles that are less than approximately 0.69 inches in height.

Figure 2:
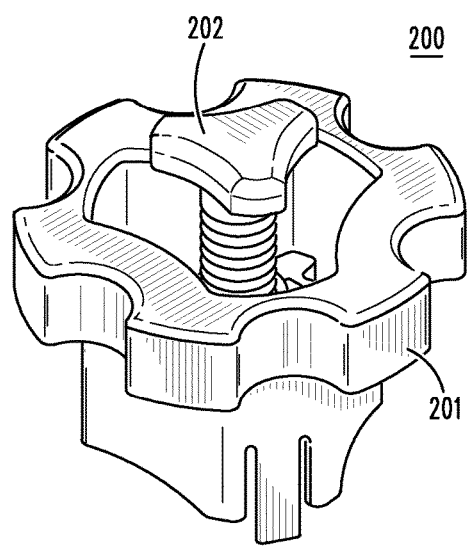
FIG. 2 is an perspective view of the adjustable valve grip of FIG. 1 according to an embodiment.

Turning now to FIG. 2 which shows a perspective view of an embodiment of an adjustable valve grip 200. According to another aspect, the present embodiments may be an adjustable valve grip 200 for a gas cylinder valve handle (not shown), the adjustable valve grip 200 comprising: a first portion 201 of the adjustable valve grip 200; a second portion 202 of the adjustable valve grip 200; wherein the first portion 201 of the adjustable valve grip 200, or the second portion 202 of the adjustable valve grip 200, are colored in such a way as to be easily visible to the human eye; wherein the second portion 202 of the adjustable valve grip 200 is a threaded screw operatively connected to the first portion 201 of the adjustable valve grip 200; wherein the first portion 201 of the adjustable valve grip 200 is dimensioned in such a way that the first portion 201 of the adjustable valve grip 200 is capable of being snap-fit over the gas cylinder valve handle (not shown); and wherein the second portion 202 of the adjustable valve grip 200 is dimensioned in such a way as to be capable of being adjusted through its operative connection to the first portion 201 of the adjustable valve grip 200 so that when the first portion 201 of the adjustable valve grip 200 has been snap fit over the gas cylinder valve handle (not shown) a user can adjust the second portion 202 of the adjustable valve grip 200 to bring the second portion 202 of the adjustable valve grip 200 into firm contact with the gas cylinder valve handle (not shown).

According to another aspect, the present embodiments may further comprise where the first portion 201 of the adjustable valve grip 200, or the second portion 202 of the adjustable valve grip 200, is colored red as to be easily visible to the human eye.

According to another aspect, the present embodiments may further comprise where both the first portion 201 of the adjustable valve grip 200, and the second portion 202 of the adjustable valve grip 200, are colored in such a way as to be easily visible to the human eye.

According to another aspect, the present embodiments may further comprise where the first portion 201 of the adjustable valve grip 200, or the second portion 202 of the adjustable valve grip 200, is colored red.

According to another aspect, the present embodiments may further comprise both the first portion 201 of the adjustable valve grip 200, and the second portion 202 of the adjustable valve grip 200, are colored the same color so as to be easily visible to the human eye.

According to another aspect, the present embodiments may further comprise both the first portion 201 of the adjustable valve grip 200, and the second portion 202 of the adjustable valve grip 200, are colored red as to be easily visible to the human eye.

According to another aspect, the present embodiments may further comprise the first portion 201 of the adjustable valve grip 200 is colored so that it is easily visible to the human eye and the second portion 202 of the adjustable valve grip 200 is colored so that it is easily visible to the human eye and both first portion 201 of the adjustable valve grip 200 and the second portion 202 of the adjustable valve grip 200 are different colors that are easily visible to the human eye.

According to another aspect, the present embodiments may further comprise the first portion 201 of the adjustable valve grip 200, or the second portion 202 of the adjustable valve grip 200, is colored red to be easily visible to the human eye.

Figure 3:
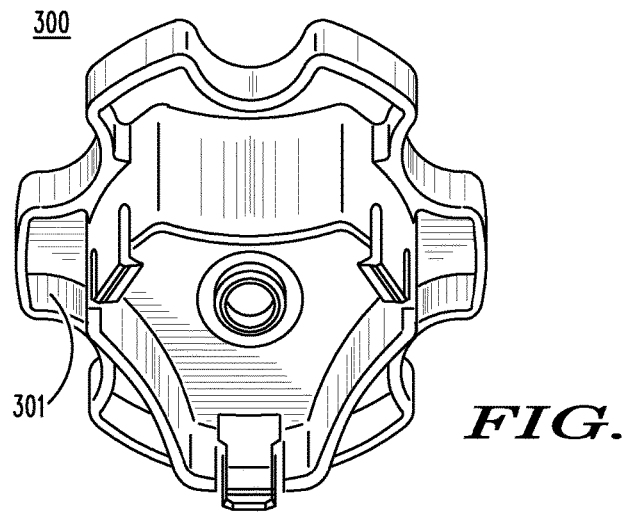
FIG. 3 is a perspective view of the bottom of an embodiment.

Turning next to FIG. 3 which shows a perspective view of an embodiment of a first portion 301 of the adjustable valve grip 300 as viewed from below. FIG. 3 shows how the first portion 301 of the adjustable valve grip 300 is dimensioned in such a way that the first portion 301 of the adjustable valve grip 300 is capable of being snap-fit over a gas cylinder valve handle (not shown).

Figure 4:
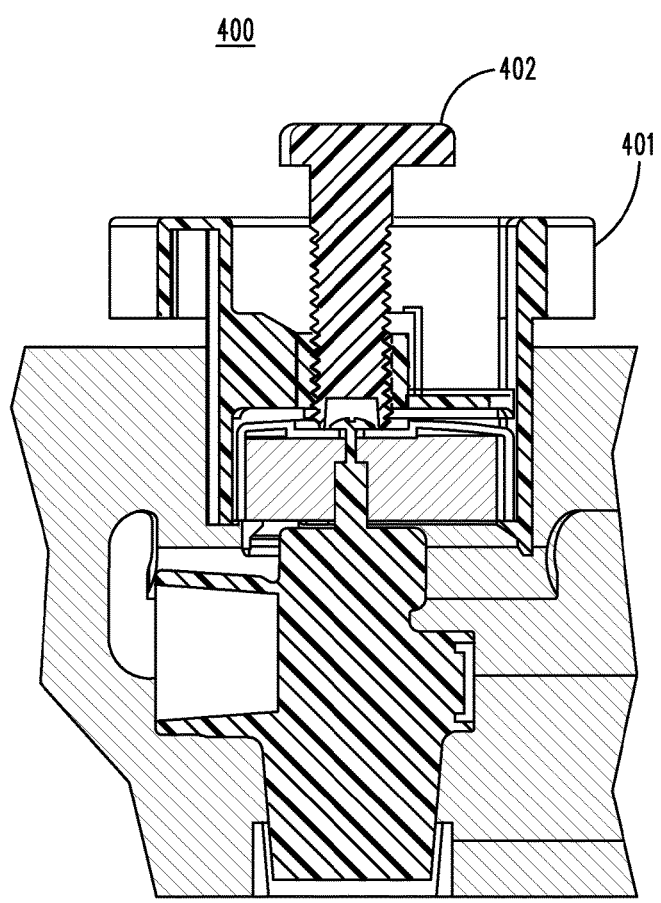
FIG. 4 is a cross-sectional side view of an embodiment of the adjustable valve grip, illustrating an adjustable valve grip installed on a portable gas cylinder valve handle.

Turning now to FIG. 4 which is a cross-sectional side view of an embodiment of the adjustable valve grip 400, illustrating an adjustable valve grip 400 installed on a portable gas cylinder valve handle. According to another aspect, the present embodiments of an adjustable valve grip 400 for a gas cylinder valve handle, the adjustable valve grip 400 comprising: a first portion 401 of the adjustable valve grip 400; a second portion 402 of the adjustable valve grip 400; wherein the first portion 401 of the adjustable valve grip 400, or the second portion 402 of the adjustable valve grip 400, or both, are colored in such a way as to be easily visible to the human eye; wherein the second portion 402 of the adjustable valve grip 400 is a threaded screw operatively connected to the first portion 401 of the adjustable valve grip 400; wherein the first portion 401 of the adjustable valve grip 400 is dimensioned such a way that the first portion 401 of the adjustable valve grip 400 is capable of being snap-fit over the gas cylinder valve handle; and wherein the second portion 402 of the adjustable valve grip 400 is dimensioned in such a way as to be capable of being adjusted through its operative connection to the first portion 401 of the adjustable valve grip 400 so that when the first portion 401 of the adjustable valve grip 400 has been snap fit over the gas cylinder valve handle a user can adjust the second portion 402 of the adjustable valve grip 400 to bring the second portion 402 of the adjustable valve grip 400 into firm contact with the gas cylinder valve handle.

Figure 5A:
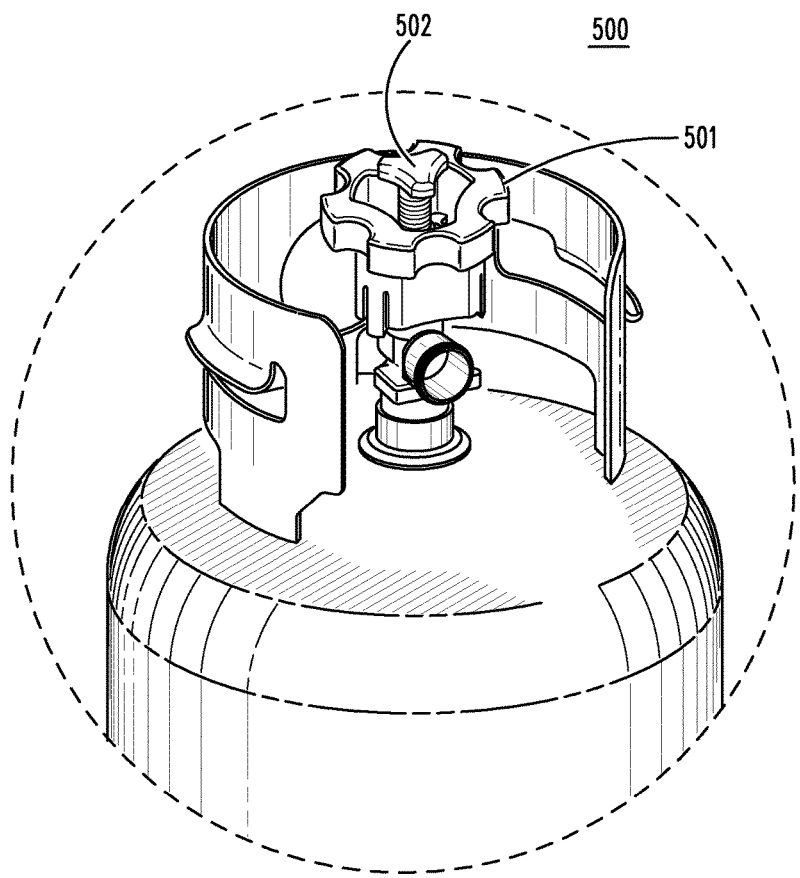
FIG. 5a is a close-up perspective view of an embodiment of the adjustable valve grip illustrating the adjustable valve grip installed on a portable gas cylinder valve handle.

Turning next to FIG. 5a which shows a close-up perspective view of an embodiment of an adjustable valve grip 500 snap fit on a portable gas cylinder. According to another aspect, the present embodiments of an adjustable valve grip 500 for a gas cylinder valve handle (not shown), the adjustable valve grip 500 comprising: a first portion 501 of the adjustable valve grip 500; a second portion 502 of the adjustable valve grip 500; wherein the first portion 501 of the adjustable valve grip 500, or the second portion 502 of the adjustable valve grip 500, or both, are colored in such a way as to be easily visible to the human eye; wherein the second portion 502 of the adjustable valve grip 500 is a threaded screw operatively connected to the first portion 501 of the adjustable valve grip 500; wherein the first portion 501 of the adjustable valve grip 500 is dimensioned such a way that the first portion 501 of the adjustable valve grip 500 is capable of being snap-fit over the gas cylinder valve handle (not shown); and wherein the second portion 502 of the adjustable valve grip 500 is dimensioned in such a way as to be capable of being adjusted through its operative connection to the first portion 501 of the adjustable valve grip 500 so that when the first portion 501 of the adjustable valve grip 500 has been snap fit over the gas cylinder valve handle (not shown) a user can adjust the second portion 502 of the adjustable valve grip 500 to bring the second portion 502 of the adjustable valve grip 500 into firm contact with the gas cylinder valve handle (not shown).

According to another aspect, the present embodiments may further comprise the first portion 501 of the adjustable valve grip 500, or the second portion 502 of the adjustable valve grip 500, is colored red to be easily visible to the human eye.

Figure 5B:
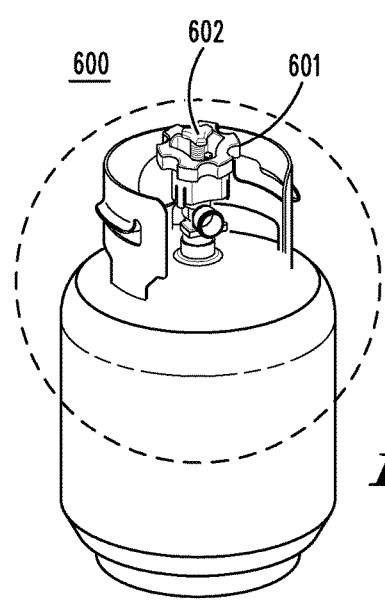
FIG. 5b is perspective view of an embodiment of the adjustable valve grip illustrating the adjustable valve grip installed on a portable gas cylinder valve handle.

Finally, turning to FIG. 5b which shows a perspective view of an embodiment of an adjustable valve grip 600 snap fit on a portable gas cylinder. According to another aspect, the present embodiments of an adjustable valve grip 600 for a gas cylinder valve handle (not shown), the adjustable valve grip 600 comprising: a first portion 601 of the adjustable valve grip 600; a second portion 602 of the adjustable valve grip 600; wherein the first portion 601 of the adjustable valve grip 600, or the second portion 602 of the adjustable valve grip 600, or both, are colored in such a way as to be easily visible to the human eye; wherein the second portion 602 of the adjustable valve grip 600 is a threaded screw operatively connected to the first portion 601 of the adjustable valve grip 600; wherein the first portion 601 of the adjustable valve grip 600 is dimensioned such a way that the first portion 601 of the adjustable valve grip 600 is capable of being snap-fit over the gas cylinder valve handle (not shown); and wherein the second portion 602 of the adjustable valve grip 600 is dimensioned in such a way as to be capable of being adjusted through its operative connection to the first portion 601 of the adjustable valve grip 600 so that when the first portion 601 of the adjustable valve grip 600 has been snap fit over the gas cylinder valve handle (not shown) a user can adjust the second portion 602 of the adjustable valve grip 600 to bring the second portion 602 of the adjustable valve grip 600 into firm contact with the gas cylinder valve handle (not shown).

The components of the apparatus illustrated are not limited to the specific embodiments described herein, but rather, features illustrated or described as part of one embodiment can be used on or in conjunction with other embodiments to yield yet a further embodiment. It is intended that the apparatus include such modifications and variations. Further, steps described in the method may be utilized independently and separately from other steps described herein.

While the apparatus and method have been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of" Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An adjustable valve grip for a gas cylinder valve handle, the adjustable valve grip comprising:
   a first portion of the adjustable valve grip;
   a second portion of the adjustable valve grip;
   wherein the second portion of the adjustable valve grip is a threaded screw operatively connected to the first portion of the adjustable valve grip, and passing through the first portion;
   wherein the first portion of the adjustable valve grip is capable of being snap-fit over the gas cylinder valve handle, the snap fit being achieved by at least three tabs located on the bottom the first portion;
   wherein the gas valve handle has a top and a bottom and an axis of rotation, the top and bottom of the gas valve handle being rotatable in a plane perpendicular to the axis of rotation; and
   wherein the adjustable valve grip is tightened to the gas valve handle by rotating the second portion such that the threaded screw is tightened and the screw exerts pressure on the top of the gas valve handle and the at least three tabs exert pressure on the bottom of the gas valve handle.

2. The adjustable valve grip of claim 1, wherein the first portion of the adjustable valve grip, or the second portion of the adjustable valve grip, is colored.

3. The adjustable valve grip of claim 1, wherein the screw exerts pressure on the top of the gas valve handle parallel the axis of the gas valve handle and the at least three tabs exert pressure on the bottom of the gas valve handle parallel the axis of the gas valve handle.

4. The adjustable valve grip of claim 3, wherein the first portion of the adjustable valve grip, or the second portion of the adjustable valve grip, is colored red.

5. The adjustable valve grip of claim 3, wherein both the first portion of the adjustable valve grip, and the second portion of the adjustable valve grip, are colored the same color.

6. The adjustable valve grip of claim 5, wherein both the first portion of the adjustable valve grip, and the second portion of the adjustable valve grip, are colored red.

7. The adjustable valve grip of claim 3, wherein the first portion of the adjustable valve grip is colored and the second portion of the adjustable valve grip is colored and both first portion of the adjustable valve grip and the second portion of the adjustable valve grip are different colors.

8. The adjustable valve grip of claim 7, wherein the first portion of the adjustable valve grip, or the second portion of the adjustable valve grip, is colored red.

9. An adjustable valve grip for a gas cylinder valve handle, the adjustable valve grip comprising:
   a first portion of the adjustable valve grip;
   a second portion of the adjustable valve grip;
   wherein the second portion of the adjustable valve grip is a threaded screw operatively connected to the first portion of the adjustable valve grip, the threaded screw having a handle, said handle being a triangle with rounded points and concave edges;
   wherein the first portion of the adjustable valve grip having a top portion and a bottom portion, the top portion being a handle portion and the bottom portion being a triangle with flattened points and concave edges, each of the flattened points having a downwardly extending tab with an inward facing ledge, said bottom portion being dimensioned in such a way that the first portion of the adjustable valve grip is capable of being snap-fit over the gas cylinder valve handle, wherein said tabs snap around the gas cylinder valve handle; and wherein the second portion of the adjustable valve grip is dimensioned in such a way as to be capable of being adjusted through its operative connection to the first portion of the adjustable valve grip so that when the first portion of the adjustable valve grip has been snap fit over the gas cylinder valve handle a user can adjust the second portion of the adjustable valve grip to bring the second portion of the adjustable valve grip into firm contact with the gas cylinder valve handle.

10. The adjustable valve grip of claim 9, wherein:

the gas valve handle has a top and a bottom and an axis of rotation, the top and bottom of the gas valve handle being rotatable in a plane perpendicular to the axis of rotation; and when the adjustable valve grip is tightened to the gas valve handle by rotating the second portion such that the threaded screw exerts pressure on the top of the gas valve handle and inwardly facing ledges on the tabs exert pressure on the bottom of the gas valve handle.

\* \* \* \* \*